United States Patent [19]
Schuetze et al.

[11] Patent Number: 6,101,320
[45] Date of Patent: Aug. 8, 2000

[54] ELECTRONIC MAIL COMMUNICATION SYSTEM AND METHOD

[75] Inventors: Robert Charles Schuetze, Aurora; Peter Sean George McPhedran, Etobiocoke, both of Canada

[73] Assignee: Aurora Communications Exchange Ltd., Thornhill, Canada

[21] Appl. No.: 08/904,689

[22] Filed: Aug. 1, 1997

[51] Int. Cl.$^7$ ..................................................... G06F 17/60
[52] U.S. Cl. .................. 395/200.36; 709/206; 709/238; 709/201; 711/1
[58] Field of Search .................................. 709/206, 238, 709/201, 217, 203, 249; 707/1; 711/1

[56] References Cited

U.S. PATENT DOCUMENTS

| | | |
|---|---|---|
| 4,677,611 | 6/1987 | Yanosy, Jr. et al. . |
| 4,922,486 | 5/1990 | Lidinsky et al. . |
| 5,283,887 | 2/1994 | Zachery . |
| 5,327,544 | 7/1994 | Lee et al. . |
| 5,333,266 | 7/1994 | Boaz et al. . |
| 5,406,557 | 4/1995 | Baudoin . |
| 5,481,698 | 1/1996 | Itoh et al. . |
| 5,497,373 | 3/1996 | Hulen et al. . |
| 5,557,780 | 9/1996 | Edwards et al. . |
| 5,627,997 | 5/1997 | Pearson et al. . |
| 5,675,507 | 10/1997 | Bobo, II .............................. 364/514 R |
| 5,680,552 | 10/1997 | Natravali et al. .................... 395/200.2 |
| 5,689,642 | 11/1997 | Harkins et al. ..................... 395/200.04 |
| 5,742,668 | 4/1998 | Pepe et al. ................................. 395/58 |
| 5,761,201 | 6/1998 | Vaudreuil ................................ 370/392 |
| 5,794,039 | 8/1998 | Guck ....................................... 395/683 |
| 5,805,810 | 9/1998 | Maxwell ................................. 709/206 |
| 5,812,770 | 9/1998 | Sakai ................................... 395/200.16 |
| 5,822,526 | 10/1998 | Waskiewicz ........................... 709/206 |
| 5,839,064 | 11/1998 | Foti ........................................ 455/413 |
| 5,848,415 | 12/1998 | Guck ....................................... 707/10 |
| 5,850,445 | 12/1998 | Chan et al. .............................. 380/23 |
| 5,862,325 | 1/1999 | Reed et al. ............................. 709/201 |
| 5,864,870 | 1/1999 | Guck ...................................... 707/104 |
| 5,889,943 | 3/1999 | Ji et al. ............................. 395/187.01 |

(List continued on next page.)

FOREIGN PATENT DOCUMENTS 2134132 7/1995 Canada .
2155775 3/1996 Canada .

OTHER PUBLICATIONS

Jonathan B. Postel, RFC0821, Simple Mail Transfer Protocol, HTTP://rfc–koeln.de/html, 80 pages, Aug. 1982.

David H. Crocker, RFC0822, Standard of the format of APRA Internet Text Messages, HTTP://rfc–koeln..de.html/, 57 pages, Aug. 1982.

N. Borenstein, RFC1344, Implications of MIME for Inmternet Mail Gateways, HTTP://rfc–koeln.de.html/, 9 pages, Jun. 1992.

J. Houttuin, RFC1506, A tutorial on gatewaying between X.400 and Internet Mail, HTTP://rfc–koeln.de.html/, 40 pages, Aug. 1993.

H. Alvestrand, RFC1685, Writing X.400 O/R names, HTT://rfc–koeln.de.html/, 11 pages, Aug. 1994.

*Primary Examiner*—Frank J. Asta
*Assistant Examiner*—Bunjob Jaroenchonwanit
*Attorney, Agent, or Firm*—Riches, McKenzie & Herbert; Jeffrey Pervanas

[57] ABSTRACT

A system and method for exchanging electronic mail between organizations having dissimilar electronic mail systems is disclosed. The electronic mail sent from the sender organization identifies the recipient organization. The system and method determine the electronic mail format used by the recipient organization from the identity of the recipient organization and convert the electronic mail into the recipient's format. The recipient's format is determined by searching for information regarding the recipient organization in internal and external databases. The electronic mail is converted from the sender's format to a standard format after receipt of the electronic mail by the system. The electronic mail is converted from the standard format to the recipient's format prior to sending the electronic mail to the recipient organization.

20 Claims, 4 Drawing Sheets

U.S. PATENT DOCUMENTS

| | | | |
|---|---|---|---|
| 5,889,954 | 3/1999 | Gessel et al. | 709/223 |
| 5,893,903 | 4/1999 | Eisdorfer et al. | 705/1 |
| 5,911,776 | 6/1999 | Guck | 709/217 |
| 5,913,028 | 6/1999 | Wang et al. | 709/203 |
| 5,917,820 | 6/1999 | Rekhter | 370/392 |
| 5,920,856 | 6/1999 | Syeda-Mahmood | 707/3 |
| 5,937,168 | 8/1999 | Anderson et al. | 709/238 |
| 5,948,059 | 9/1999 | Woo et al. | 709/206 |
| 5,951,638 | 9/1999 | Hoss et al. | 709/206 |
| 5,974,449 | 10/1999 | Chang et al. | 709/206 |
| 5,991,375 | 11/1999 | Stahl et al. | 379/311 |
| 6,034,963 | 3/2000 | Minami et al. | 370/401 |

ND MAIL COMMUNICATION
ELECTRONIC MAIL COMMUNICATION SYSTEM AND METHOD

FIELD OF THE INVENTION

This invention relates to an electronic mail communication system and a method of communicating electronic mail. More particularly, the present invention relates to an electronic mail communication system and a method for communicating electronic mail between separate organizations which may use dissimilar electronic mail formats to receive and send electronic mail.

BACKGROUND OF THE INVENTION

Computer mail systems, also known as electronic mail systems, allow a first user to send messages by electronic transmission to a second user. In general, the user to whom a message is sent is referred to as the addressee or recipient of the message and the user that sends the message is referred to as the sender.

Several computer mail systems have been developed to allow electronic transmission of electronic mail between users. Each computer mail system has a distinct electronic mail format, which includes protocols for addressing, formatting and sending electronic mail. Generally, electronic mail formatted for use on one computer mail system can not be used on a second mail system unless the format is converted to the format of the second mail system.

An organization, such as a company or a division within a company, generally uses the same computer mail system throughout the organization. In this case, all electronic mail sent within the organization can be easily transmitted from the sender to the recipient, because both the sender and the recipient are using the same computer mail system and the electronic mail need not be converted from one format to a different format. However, if a user within an organization desires to send electronic mail to a user at another organization, then that electronic mail must be converted from the electronic mail format of the sender organization, namely the sender's format, to the electronic mail format of the recipient organization, namely the recipient's format, if the sender's format differs from the recipient's format.

Two different computer mail systems having different electronic mail formats may be connected by means of a gateway. A gateway is a device used to connect networks or computer mail systems using different communication protocols and formats. A gateway both transfers information and converts the information to a format compatible with the format and protocols of the recipient organization's computer mail system.

However, many practical problems arise when a sender desires to send electronic mail to a recipient using a different computer mail system. For example, the sender at the sender organization does not always know the electronic mail format used by the computer mail system at the recipient organization to which the electronic mail is being sent. In this case, some prior art devices will send the message in the sender's format relying on the recipient to have a gateway which can convert the electronic mail from the sender's format into the recipient's format. One disadvantage of these prior art systems is that, as the different types of electronic mail systems proliferate, there is an ever increasing likelihood that the recipient organization will not have a gateway or conversion program which can convert electronic messages from the sender's format into the recipient's format. Also, while many gateways can convert electronic mail to different formats, several gateways cannot cleanly convert the attachments to electronic mail, such as drawings.

A further disadvantage is that the cost of acquiring gateways that can convert electronic messages from a number of different formats to the recipient's format increases greatly as additional types of electronic mail systems are introduced and gain prominence. This disadvantage is compounded by the fact that various existing types of electronic mail formats are occasionally revised, thereby necessitating gateways which can convert different versions of the same electronic mail format.

Another way the prior art systems attempt to overcome the disadvantage of not knowing the recipient's format is to convert all of the sender's electronic mail to a common or standard format, such as the American Standard Code for Information Interchange (ASCII), or, the Extended Binary Code Decimal Interchange Code (EBCDIC). However, this approach suffers from the disadvantage that by converting electronic mail to these types of standard systems, any word processing encoding, such as paragraph indent, carriage return and underlining, is often stripped from the electronic mail. In addition, if the electronic mail comprises an attachment, such as a drawing, the attachment is often garbled. In addition, many electronic mail formats inherently encrypt the message to increase security during transmission, but this encryption and added security is lost when the electronic mail is converted into a standard format, leaving the standard formatted electronic mail accessible to others.

Another way in which the prior art systems have attempted to overcome these disadvantages is by keeping a directory of the various recipients to whom users at a sender organization may desire to send electronic mail. The disadvantage of this approach is that the directories are complex structures and they are dependent on the users at specific recipient organizations rather than dependent on the recipient organization itself. In this way, a large number of information regarding individual recipients must be kept at directories located at the sender organizations. In addition, these directories must be updated to reflect changes and locations of recipients and changes in the electronic mail systems used by the recipient organizations. Any change of information regarding a potential recipient, such as a change in the recipient's location, a change in their employment or a change in the recipient's format used by the recipient organization, must be reflected in the directory.

The administrative process of ensuring that all directories are current and correct is called "directory synchronization". Directory synchronization is a complex task, and becomes increasingly complex as the number of potential recipients in the directories increases. While there are some tools to help with directory synchronization, the task of ensuring that changes in the directories are complete and efficient is one of the most daunting tasks now facing electronic mail delivery systems. In some cases, directory synchronization can be a barrier to building a workable computer mail system.

SUMMARY OF THE INVENTION

Accordingly, it is an object of this invention to at least partially overcome some of the disadvantages of the prior art. Also, it is an object of this invention to provide an improved type of electronic mail communication system which can more efficiently and seemlessly communicate electronic mail between organizations using dissimilar electronic mail formats.

Accordingly, in one of its objects, this invention resides in a system for communicating electronic mail, said electronic mail having a format and identifying a recipient organization which recipient organization receives electronic mail in a recipient's format, said system comprising: at least two exchange means, each exchange means receiving and sending electronic mail in one of a plurality of distinct formats; gateway means associated with each exchange means for converting the electronic mail to the format of the exchange means; and routing means connected to the gateway means for routing the electronic mail to one of the exchange means through the gateway means; wherein one of the exchange means can receive mail from a sender organization in a sender format; and wherein the routing means determines the recipient's format from the identity of the recipient organization and routes the electronic mail through the gateway means to the exchange means which can receive and send electronic mail in the recipient's format.

In a further aspect, the present invention resides in an electronic mail communication system for communicating electronic mail, said electronic mail having a format and identifying a recipient organization which can receive the electronic mail in a recipient's format, said system comprising: receiving means for receiving electronic mail in a sender's format from a sender organization; a plurality of sending means, each sending means sending electronic mail in one of a plurality of distinct formats; gateway means associated with each of the sending means for converting the electronic mail into the format of the sending means; and routing means connected to the receiving means and the gateway means for receiving the electronic mail from the receiving means and routing the electronic mail to one of the sending means through the gateway means; and wherein the routing means determines the recipient's format from the identity of the recipient organization and routes the electronic mail through the gateway means to the sending means which can send mail in the recipient's format.

In a still further aspect, the present invention provides a method for communicating electronic mail between a sender organization and a recipient organization which can receive mail in a recipient's format comprising the steps of: receiving electronic mail in a sender's format from a sender organization, said electronic mail identifying a recipient organization for which the electronic mail is destined; determining the recipient's format from the identity of the recipient organization; and routing the electronic mail to an exchange means which can send the electronic mail to the recipient organization in the recipient's format.

Accordingly, the present invention provides an electronic mail communication system which can facilitate communication of electronic mail from a sender at a sender organization which sends electronic mail in a sender's format to a recipient at a recipient organization which receives electronic mail in a recipient's format. One advantage of the present invention is that the sender organization need not know the recipient's format.

A further advantage of the present invention is that conversion of the electronic mail from the sender's format into the recipient's format is performed internally of the electronic mail communication system. In this way, the sender organization and the recipient organization need not have gateways or conversion software to convert electronic mail from the sender's format to the recipient's format, whatever these formats may be. This decreases the complexity and cost of the computer mail systems at the sender and recipient organizations.

A further advantage of the present system is that communication of electronic mail from the sender organization to the system is performed in the sender's format, so that the electronic mail is encrypted by the sender's format during transmission to the system. Likewise, the electronic mail sent from the system to the recipient's organization is encrypted by the recipient's format. In this way, electronic mail transmitted externally of the system is always encrypted, thereby increasing the security of the electronic mail transmission.

A still further advantage of the present invention is that the system determines the recipient's format from the identity of the recipient organization, rather than the identity of the recipient at the recipient organization. This simplifies the operation of the electronic mail communication system at the sender's organization because the sender organization need not maintain a directory of all of the potential recipients and their electronic mail formats. Also, the individual users at each of the recipient and sender organizations need not be disclosed to the operators of the electronic mail communication system. The recipient at the recipient organization is determined by the recipient organization's directory which must be maintained in any event by the recipient organization.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1A:
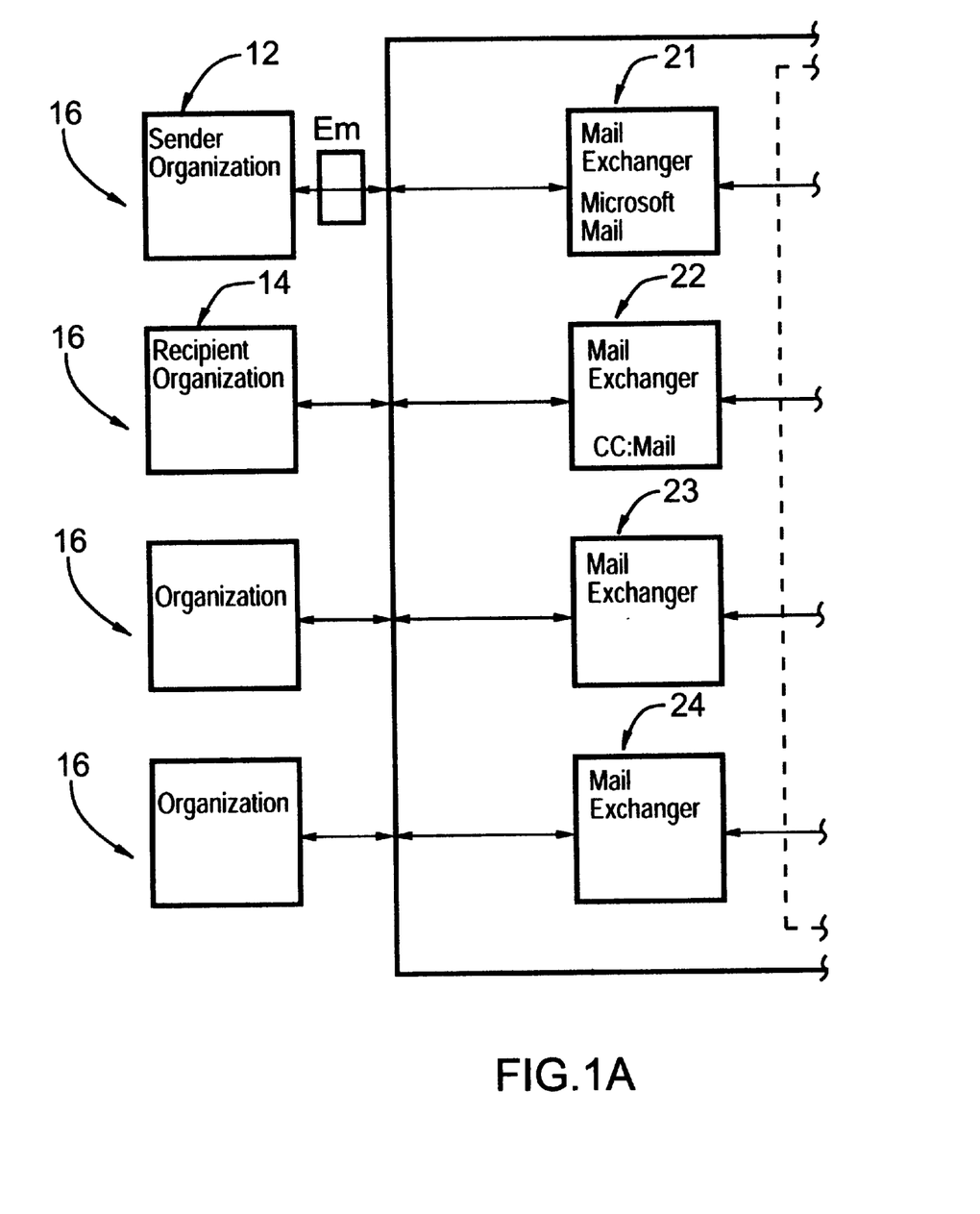
FIG. 1 shows a schematic drawing of an electronic mail communication system according to one embodiment of the invention.
Figure 1B:
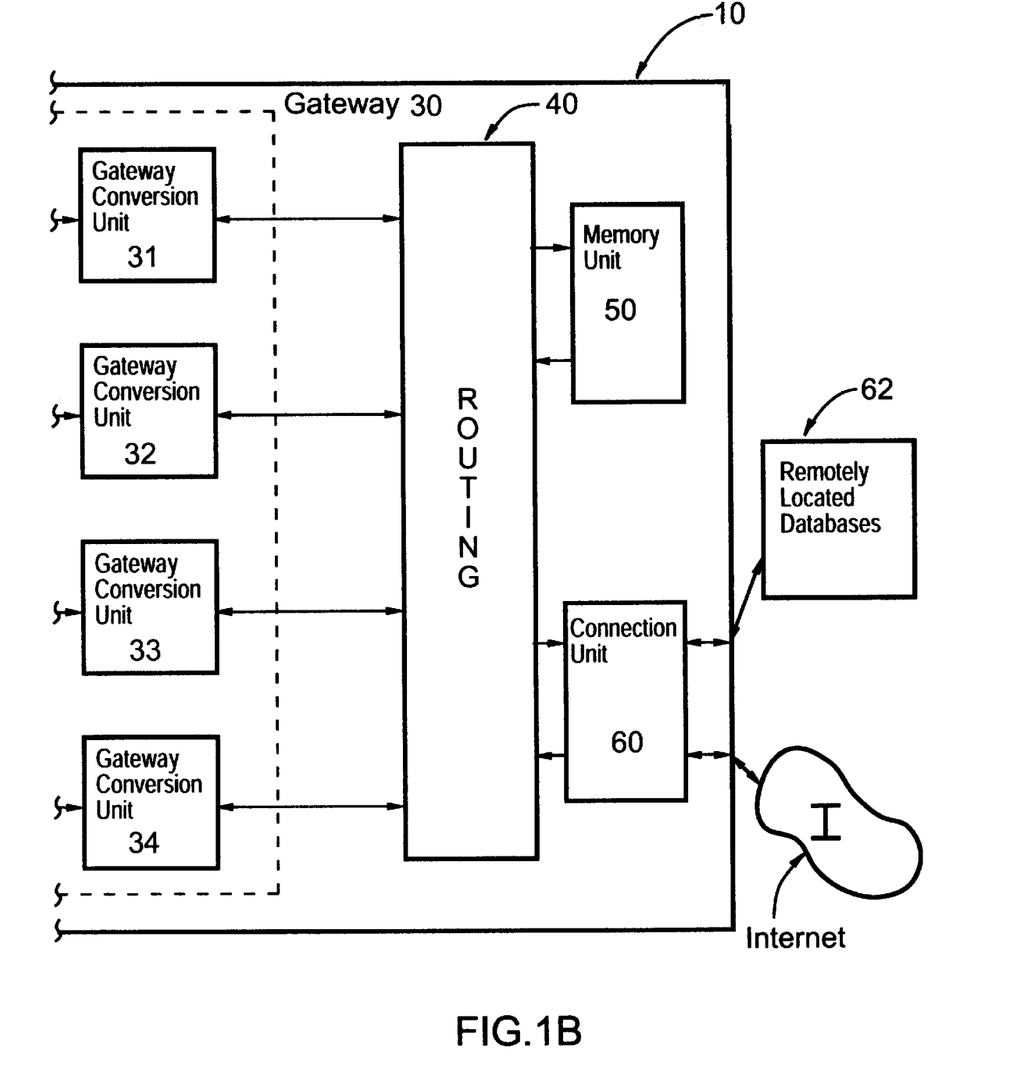

FIG. 1 shows an electronic mail communication system, marked generally by reference numeral 10, according to one embodiment of the present invention. As shown in FIG. 1, the electronic mail communication system 10 is connected to several organizations 16. For the purposes of describing the invention, an organization has been identified as the sender organization 12 and another organization has been identified as the recipient organization 14. However, it is understood that the system 10 can facilitate communication of electronic mail between any number of organizations 16 and any of the organizations 16 can be either the sender organization 12 or the recipient organization 14.

As shown in FIG. 1, the sender organization 12 in this embodiment is sending electronic mail, shown generally as $E_M$ in FIG. 1. The electronic mail $E_M$ is transmitted in the sender's format to the system 10 by any known means, such as telephone wires, wireless transmission, etc.

The electronic mail EM from the sender organization 12 will identify the recipient organization 14 to which the electronic mail $E_M$ is destined for. The electronic mail $E_M$ will also generally identify a user at the recipient organization 14 which is the intended recipient of the electronic mail $E_M$. For example, an electronic mail transmission from the sender organization 12 could be destined for (recipient@Recipient.com) which identifies the recipient organization 14 as being "Recipient.com" and the individual user at the recipient organization 14 being "recipient".

The system 10 receives the electronic mail $E_M$ through a mail exchanger 21. The system 10 comprises at least two mail exchangers 21 and 22, and preferably a plurality of mail exchangers 21, 22, 23, 24.

Each mail exchanger 21, 22, 23, 24 receives and sends electronic mail in one of a plurality of distinct electronic mail formats. For example, mail exchanger 21 could receive and send electronic mail in Microsoft MAIL ("MS MAIL") by Microsoft and mail exchanger 22 could receive and send electronic mail in cc:MAIL by Lotus Development Corporation. Other mail exchangers 23, 24 would receive and send mail in other distinct electronic mail formats, such as QUICKMAIL by CE Software, EUDORA by Qualcomm, Inc. and Pegasus by David Harris.

Each of the organizations 16 will connect to the system 10 through the mail exchanger 21, 22, 23, 24 which can receive and send electronic mail in the electronic mail format of the organization 16. For example, if the sender organization 12 operates in MS MAIL, the sender organization 12 will connect to the system 10 through mail exchanger 21 which also operates in MS MAIL. Likewise, if the recipient organization 14 operates in cc:MAIL, it will connect to the system 10 through mail exchanger 22 which, in the example shown in FIG. 1, also operates in cc:MAIL.

The system 10 further comprises a gateway 30 for converting electronic mail sent or received to the corresponding format of the mail exchanger 21, 22, 23, 24.

The gateway 30 is connected to a routing unit 40 which routes the electronic mail EM received by the system 10 to the appropriate mail exchanger 21, 22, 23, 24. The routing unit 40 does this by determining the recipient's format from the identity of the recipient organization 14 and routes the electronic mail $E_M$ through the gateway 30 to the mail exchanger 22 which can receive and send electronic mail in the recipient's format.

In the example shown in FIG. 1, the electronic mail $E_M$ identifies the recipient organization as "Recipient.com" and from this, the routing unit 40 can determine that the electronic mail $E_M$ is destined for the recipient organization 14. Once the routing unit 40 determines the identity of the recipient organization 14, the routing unit 40 can determine the recipient's format used by the recipient organization 14. In the example shown in FIG. 1, the routing unit 40 will determine that the recipient's format used by the recipient organization 14 is cc:MAIL and route the electronic mail $E_M$ to the mail exchanger 22. The routing unit 40 routes the electronic mail $E_M$ through the gateway 30 to the mail exchanger 22 so that the gateway 30 converts the electronic mail $E_M$ into the recipient's format.

Once the electronic mail $E_M$ has been converted to the recipient's format, it is stored at the mail exchanger 22 and awaits receipt by the recipient organization 14. This can be done in a number of ways. For example, the system 10 can notify the recipient organization 14 that it has mail, or, the recipient organization 14 can periodically contact the system 10 and check for mail. In either case, the mail exchanger 22 can operate as a "virtual post office" for the recipient organization 14 by storing the electronic mail $E_M$ destined for the recipient organization 14 in a "virtual post office box" which can send the electronic mail to the recipient organization 14.

The routing unit 40 can determine the recipient's format in a number of ways. In one embodiment, the system 10 comprises a memory unit 50 which can store information regarding the electronic mail format used by a plurality of organizations 16. Since the electronic mail $E_M$ identifies the recipient organization 14, the routing unit 40 can search through the memory unit 50 for the recipient organization 14 amongst the information regarding the plurality of organizations 16 stored in the memory unit 50. If the routing unit 40 locates information regarding the recipient organization 14 in the memory unit 50, the information regarding the electronic mail format used by the recipient organization 14 to receive electronic mail, which corresponds to the recipient's format, is transferred from the memory unit 50 to the routing unit 40. The routing unit 40 then has the recipient's format and can route the electronic mail $E_M$ through the gateway 30 to the appropriate mail exchanger 22 which can receive and send electronic mail in the recipient's format.

The information regarding which electronic mail formats is used by each organization of a plurality of organizations 16 to receive electronic mail is compiled by the memory unit 50 from various sources. For example, if the system 10 has recently received or sent information to a particular organization 16, the electronic mail format used by that organization 16 could be stored in the memory unit 50. In addition, a number of organizations 16 may be clients and subscribe to the services offered by the system 10, and at the time of subscription, the format used by the organization 16 is stored in the memory unit 50 and periodically updated.

If the routing unit 40 does not locate the recipient organization 14 amongst the plurality of organizations 16 stored in the memory unit 50, the routing unit 40 performs searches of external databases located remotely of the system 10. These remotely located databases 62 are shown generally by reference numeral 62. Preferably, the system 10 comprises a connection unit 60 which can connect the system 10 to the remotely located databases 62. The system 10 can then search the remotely located databases 62 for information regarding the recipient organization 14 and download the information regarding the electronic format used by the recipient organization 14 from the remotely located databases 62 to the system 10 and to the routing unit 40. The routing unit 40 then routes the electronic mail $E_M$ through the gateway 30 to the mail exchanger 22 which can receive and send electronic mail in the recipient's format based on the information downloaded from the remotely located databases 62.

For example, files containing information regarding organization 16 are often stored and maintained in remotely located databases to permit the proper operation of the Internet. These files are often referred to as "ZONE" files and the information contained in the "ZONE" files generally includes a field called "MX" which contains information regarding the mail system 10 and electronic mail format preferred by the organization 16. The MX field can also contain a preference value with numeric values representing higher logical preferences.

The remotely located databases 62 could be databases to which the system 10 are directly connected, or, could be databases which the system 10 accesses through the internet I. In either case, the routing unit 40 will connect to the remotely located databases 62 or the Internet I through the connection unit 60 to search for information regarding the electronic mail format used by the recipient organization 14.

Preferably, the recipient organization 14 is identified in the electronic mail $E_M$ by a standard formatted address, similar to the address used by the recipient organization 14 to transfer electronic mail on the internet I. This facilitates searching for the recipient organization 14 in remotely located databases 62 and on the internet I. In addition, if the routing unit 40 cannot locate information regarding the electronic mail format of the recipient organization 14 in the memory unit 50, the remotely located databases 62 or through a search of the internet I, the routing unit 40 can route the electronic mail $E_M$ to a mail exchanger which can send the electronic mail $E_M$ to the recipient organization 14 on the internet I using the standard formatted address. In this case, the connection unit 60 could act as the mail exchanger to send the electronic mail through the internet I. When the electronic mail EM is sent through the connection unit 60 to the internet I, it will be sent in a format which is native to the internet I, and not necessarily in the recipient's format.

It is apparent that, in all cases the routing unit 40 can determine the recipient's format, electronic mail $E_M$ is sent to the recipient organization 14 in the recipient's format. The searching performed, either through the memory unit 50, the remotely located databases 62 or the internet I to determine the recipient's format does not involve transferring the electronic mail $E_M$ through the internet I. In this way, the confidentially of the electronic mail $E_M$ is maintained because the electronic mail $E_M$ is not transferred through the internet I or to other organizations 16 or the remotely located databases 62.

It is also apparent that transmission of the electronic mail $E_M$ to the system 10 from the sender organization 12 and from the system 10 to the recipient organization 14 will be in a non-standard format, which in this example, is MS MAIL and cc:MAIL. Because of this, the electronic mail $E_M$ will be encrypted by the sender's format and then the recipient's format maintaining confidentiality of the electronic mail $E_M$. In addition, while not necessary, it is preferable that the connection between the sender organization 12 and the system 10 and the connection between the system 10 and the recipient organization 14 Will be done directly through a telephone wire which is also inherently confidential.

In a preferred embodiment, the gateway 30 comprises at least two gateway conversion units 31, 32, 33, 34, each gateway conversion unit 31, 32, 33, 34 uniquely corresponding to one of the mail exchangers 21, 22, 23, 24 such that the gateway conversion unit 31, 32, 33, 34 converts electronic mail received by the corresponding mail exchanger 21, 22, 23, 24 from the format of the mail exchanger 21, 22, 23, 24 into a standard format. The gateway conversion units 31, 32, 33, 34 also convert the electronic mail to be sent to the corresponding mail exchanger 21, 22, 23, 24 from the standard format into the format of the mail exchanger 21, 22, 23, 24. In this way, when the routing unit 40 routes the electronic mail $E_M$ to the appropriate mail exchanger 21, 22, 23, 24 which can receive and send electronic mail in the recipient's format, the routing unit 40 routes the electronic mail $E_M$ to the gateway conversion unit 31, 32, 33, 34 which can receive and send electronic mail in the recipient's format. The gateway conversion unit 31, 32, 33, 34 then sends the electronic mail $E_M$, in the recipient's format, to the corresponding mail exchanger 21, 22, 23, 24.

This arrangement is preferred because, by using a standard format, each gateway conversion unit 31, 32, 33, 34 need only convert electronic mail between the standard format and the format of the corresponding mail exchanger 21, 22, 23, 24. Otherwise, if a standard format was not used, each gateway conversion unit 31, 32, 33, 34 would need to have the ability to convert electronic mail between a number of different electronic mail formats, corresponding to the formats of the mail exchangers 21, 22, 23, 24.

In addition, it is not always possible to have a seamless conversion between several distinct electronic mail formats. Therefore, by converting all of the electronic mail to and from a standard format, it is possible to select a standard format which avoids degradation of the electronic mail and any attachments to the electronic mail. In a preferred embodiment, the standard format is Multinet Internet Mail Extensions, also known by the acronym "MIME". MIME is a protocol for sending non-ASCII data, for example, sound, video and graphics, over the internet using text-based transport protocol such as Simple Mail Transfer Protocol (SMTP). One advantage of using MIME as the standard format is that electronic mail, and in particular attachments, can be easily converted between MIME and other electronic mail formats with little or no degradation of the electronic mail or attachments. Also, in the event that the recipient's format cannot be located in the memory unit 50, or in any other location, and it becomes necessary to send electronic mail to the recipient organization 14 through the internet I, the MIME protocol can be sent directly through the connection unit 60 to the internet I without further conversion.

Figure 2:
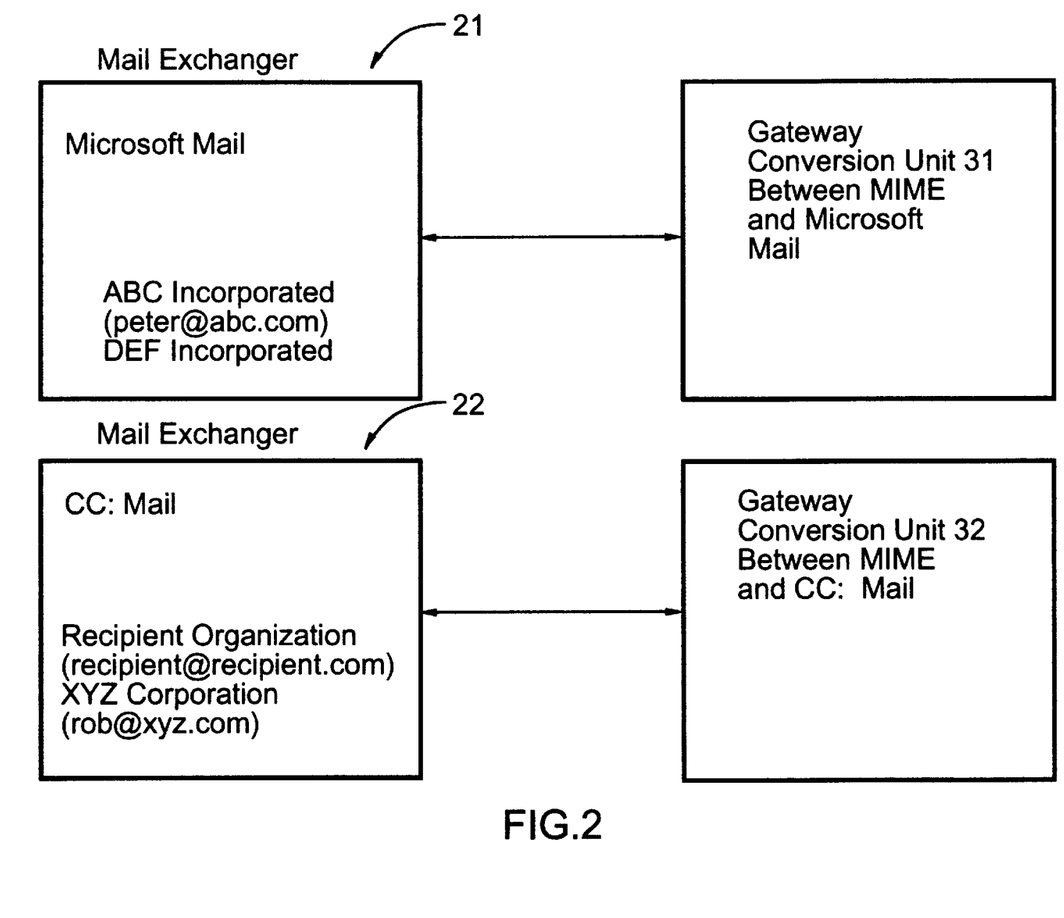
FIG. 2 shows in more detail the mail exchangers and gateways of the embodiment shown in FIG. 1.

FIG. 2 shows the sender's and recipient's mail exchangers 21, 22 and the corresponding gateway conversion unit 31, 32 in more detail. FIG. 2 shows a preferred embodiment of the system 10 where the standard format is the MIME format and mail exchanger 21 sends and receives electronic mail in the MS MAIL format and mail exchanger 22 sends and receives electronic mail in the cc:MAIL format.

The mail exchangers 21 and 22 can send and receive electronic mail to and from the organizations 16, including the sender organization 12 and the recipient organization 14 in a number of ways which may be dependent on the preferences of each of the organizations 16. In a preferred embodiment, the mail exchangers 21 and 22 store the electronic mail destined for the recipient organization 14, and transfers the electronic mail to the recipient organization 14 when the recipient organization 14 asks for the electronic mail to be sent or independently contacts the recipient organization 14 to initiate a transfer of the electronic mail. FIG. 2 shows the mail exchanger 22 storing in cc:MAIL format the electronic mail $E_M$ destined for the recipient organization 14. This is illustrated in FIG. 2 by the recipient organization 14 being identified in the mail exchanger 22 with the electronic mail $E_M$ destined for the recipient organization shown by "(recipient@Recipient.com)".

Therefore, the mail exchanger 22 acts as a "virtual post office" for the recipient organization 14 and all electronic mail, such as the electronic mail identified by (recipient@Recipient.com) is shown in a "virtual post office box" for the recipient organization. In a similar way, mail exchanger 22 has a "virtual post office box" for the company "XYZ Corporation" with electronic mail stored in this "virtual post office box" shown as (rob@xyz.com). Both the recipient organization 14 and the XYZ Corporation will be able to receive and send electronic mail in the format corresponding to the format of mail exchanger 22, namely cc:MAIL. Likewise, mail exchanger 21, which in this embodiment operates in MS MAIL, has stored therein in the "virtual post office" for the company "ABC Incorporated" the electronic mail shown as (peter@abc.com). By way of illustration, mail exchanger 21 also shows a "virtual post office box" for the company "DEF Incorporated" which is another company connected to the mail exchanger 21, but this "virtual post office box" does not have any electronic mail stored therein. The electronic mail $E_M$ is stored in the appropriate "virtual post office box" by the corresponding gateway conversion unit 31, 32, 33, 34 after conversion of the electronic mail $E_M$ to the format of the mail exchanger 21, 22, 23, 24.

When the electronic mail $E_M$ is sent from the mail exchanger 21, 22 to the appropriate organization 16, the organization 16 will then identify the recipient of the electronic mail $E_M$ and send the electronic mail $E_M$ to the appropriate recipient within the organization 16. In this way, the system 10 need not know nor track the individual recipients of the electronic mail $E_M$, but rather need only be concerned with the identity and format used by the organization 16.

Figure 3:
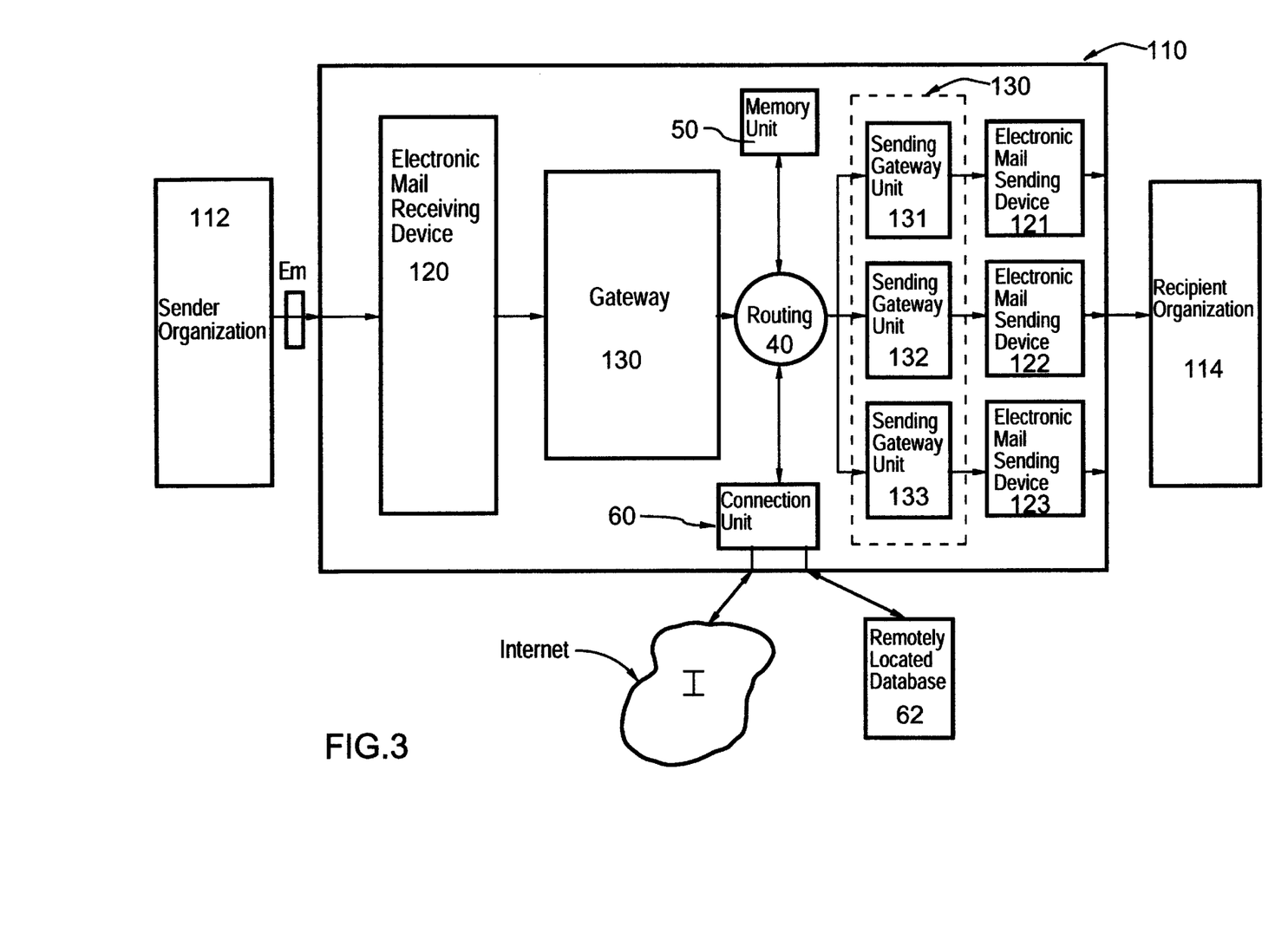
FIG. 3 shows a schematic drawing of an electronic mail communication system according to a further embodiment of the invention.

FIG. 3 shows an electronic mail communication system, shown generally by reference numeral 110. The electronic mail communication system 110 has several common components to the electronic mail communication system 10 shown in FIG. 1, such a the memory unit 50, the routing unit 40 and the connection unit 60.

However, the electronic mail communication system 110 has an electronic mail receiving device 120 which receives electronic mail from the sender organization 112 in the sender's format. The electronic mail receiving device 120 is similar to the mail exchangers 21, 22, 23, 24 shown in FIG. 1, but can only receive electronic mail. The electronic mail receiving device 120 is not designed to also send electronic mail to the sender organization 112.

In a preferred embodiment, as shown in FIG. 3, the electronic mail $E_M$ is converted by the gateway 130 into a standard format, and then sent through routing unit 40. The routing unit 40 operates in the same manner as the routing unit 40 shown in FIG. 1, in that it determines the recipient's format from the identity of the recipient organization 114 and routes the electronic mail $E_M$ through the gateway 130 to the electronic mail sending devices 121, 122, 123 which can send electronic mail in the recipient's format.

The electronic mail sending devices 121, 122, 123 are similar to the mail exchangers 21, 22, 23, 24 in that they send electronic mail in one of a plurality of distinct formats, but they do not have the capability to receive electronic mail. One of the electronic mail sending devices, shown by reference numeral 122 in FIG. 3, can send electronic mail in the recipient's format. The electronic mail communication system 110 shown in FIG. 3 operates in a similar manner to the electronic mail communication system 10 shown in FIG. 1, except that the electronic mail receiving device 120 in FIG. 3 can only receive electronic mail while the electronic mail sending devices 121, 122, 123 can only send electronic mail.

The electronic mail communication system 110 shown in FIG. 3 can be used in cases where only unidirectional communication will occur from the sender organization 112 to the recipient organization 114. In the alternative, a second electronic mail communication system 110 could be used to receive electronic mail from the recipient organization 114, or other organizations (not shown), through an electronic mail receiving device 120, and, to send the electronic mail to the other organizations (not shown).

It is understood that the organizations 16, including the sender organizations 12, 112 and the recipient organizations 14, 114, can refer to any type of organization, such as a company, corporation, government agency, or any other group which has a common electronic mail system. The recipient organization 14 could also be a company which resends the electronic mail to its clients, such as a pager company which retransmits the electronic mail to the users of the pagers.

Many corporations have only one electronic mail system so that all users in the corporation would be grouped as one organization 16. However, in some larger corporations, which have several divisions and/or several branches, the same corporation may have users using different electronic mail systems. In this case, the corporation would need to be more specific, such as by identifying a division or department of the corporation where all of the users have one electronic mail system. For example, if company "XYZ Corporation" had a sales division operating under MS MAIL but the technical division operated under cc:MAIL, then the sales division would be identified by "sales.xyz.com" and the technical division would be a separate organization identified as "tech.xyz.com". In this case, if a user at the sales division of XYZ Corporation desired to send electronic mail to a user at the technical division of XYZ Corporation, systems 10, 110 would treat the separate divisions of XYZ Corporation as separate organizations.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

What is claimed is:

1. A system for communicating electronic mail, said electronic mail having a format and identifying a recipient organization which recipient organization receives electronic mail in a recipient's format, said system comprising:

at least two exchange means, each exchange means receiving and sending electronic mail in one of a plurality of distinct formats;

gateway means associated with each exchange means for converting the electronic mail to the format of the exchange means; and routing means connected to the gateway means for determining the recipient's format from the identity of the recipient organization and routing the electronic mail to one of the exchange means through the gateway means;

wherein one of the exchange means can receive mail from a sender organization in a sender format; and wherein the routing means determines the recipient's form at from the identity of the recipient organization and routes the electronic mail through the gateway means to the exchange means which can receive and send electronic mail in the recipient's format.

2. The system as defined in claim 1 further comprising:

memory means for storing information regarding which electronic mail format is used by each organization of a plurality of organizations to receive electronic mail;

wherein the routing means determines the recipient's format by searching the memory means for the recipient organization in the plurality of organizations, and if information regarding the recipient organization is located in the memory means, transferring the information regarding the electronic mail format used by the recipient organization to receive electronic mail, which corresponds to the recipient's format, from the memory means to the routing means and routes the electronic mail through the gateway means to the exchange means which can receive and send electronic mail in the recipient's format.

3. The system as defined in claim 2 wherein if the recipient organization is not located in the memory means, the routing means determines the recipient's format by searching for information regarding the recipient organization in a remotely located database, and if information regarding the recipient organization is located in the remotely located database, downloading the information regarding the electronic mail format used by the recipient organization to receive electronic mail, which electronic mail format corresponds to the recipient's format, from the remotely located database to the routing means and routes the electronic mail through the gateway means to the exchange means which can receive and send electronic mail in the recipient's format.

4. The system as defined in claim 3 wherein the electronic mail identifies the recipient organization by a standard formatted address; and wherein if information regarding the electronic mail format of the recipient organization is not located in the memory means or through the remotely located database, the routing means routes the electronic mail to an exchange means which can send electronic mail on an internet which uses the standard formatted address.

5. The system as defined in claim 1 wherein the electronic mail identifies the recipient organization by a standard formatted address;

wherein the routing means determines the recipient's format by searching for information regarding the recipient organization through an internet using the standard formatted address, and if information regarding the recipient organization is located through the search of the internet, downloading the information regarding the electronic format used by the recipient organization to receive electronic mail, which electronic mail format corresponds to the recipient's format, from the internet to the routing means and routes the electronic mail through the gateway means to the exchange means which can receive and send electronic mail in the recipient's format.

6. The system as defined in claim 1 wherein the gateway means comprises at least two gateway conversion means, each gateway conversion means uniquely corresponding to one of the exchange means such that the gateway conversion means converts electronic mail received by the corresponding exchange means from the format of the exchange means into a standard format and converts electronic mail to be sent by the corresponding exchange means from the standard format into the format of the exchange means; and wherein the routing means routes the electronic mail to the exchange means which can receive and send mail in the recipient's format by routing the electronic mail to the gateway conversion means corresponding to the exchange means which can receive and send mail in the recipient's format.

7. The system as defined in claim 6 wherein the standard format is selected to avoid degradation of the electronic mail and attachments to the electronic mail.

8. The system as defined in claim 6 wherein the standard format is Multinet Internet Mail Extensions (MIME).

9. The system as defined in claim 1 wherein the exchange means stores the electronic mail until the recipient organization asks for the electronic mail to be sent.

10. The system as defined in claim 9 wherein the recipient's format encrypts the electronic mail when the electronic mail is sent from the exchange means to the recipient's organization.

11. The system as defined in claim 10 wherein a directory of users at the recipient organization is stored at the recipient organization and is not stored within the system.

12. The system as defined in claim 1 wherein the sender's organization does not have information regarding the recipient's format.

13. An electronic mail communication system for communicating electronic mail, said electronic mail having a format and identifying a recipient organization which can receive the electronic mail in a recipient's for that, said system comprising:

receiving means for receiving electronic mail in a sender's format from a sender organization;

a plurality of sending means, each sending means sending electronic mail in one of a plurality of distinct formats;

gateway means associated with each of the sending means for converting the electronic mail into the format of the sending means; and routing means connected to the receiving means and the gateway means for receiving the electronic mail from the receiving means, determining the recipient's format from the identity of the recipient organization and routing the electronic mail to one of the sending means through the gateway means; and wherein the routing means determines the recipient's format from the identity of the recipient organization and routes the electronic mail through the gateway means to the sending means which can send mail in the recipient's format.

14. The electronic mail communication system as defined in claim 13 further comprising:

memory means for storing information regarding which electronic mail format is used by each organization of a plurality of organizations to receive electronic mail;

wherein the routing means determines the recipient's format by searching the memory means for the recipient organization in the plurality of organizations, and if information regarding the recipient organization is located in the memory means, transferring the information regarding the electronic mail format used by the recipient organization to receive electronic mail, which corresponds to the recipient's format, from the memory means to the routing means and routes the electronic mail through the gateway means to the sending means which can send electronic mail in the recipient's format.

15. The system as defined in claim 14 wherein if the recipient organization is not located in the memory means, the routing means determines the recipient's format by searching for information regarding the recipient organization in a remotely located database, and if the recipient organization is located in the remotely located database, downloading the information regarding the electronic mail format used by the recipient organization to receive electronic mail, which electronic mail format corresponds to the recipient's format, from the remotely located database to the routing means and routes the electronic mail through the gateway means to the sending means which can send electronic mail in the recipient's format.

16. The electronic mail communication system as defined in claim 13 further comprising:

receiving gateway means for converting the electronic mail from the sender's format into a standard format;

wherein the gateway means comprises a plurality of sending gateway means, one sending gateway means associated with each of the sending means, for converting the electronic mail from the standard format into the format of the sending means with which the sending gateway means is associated; and wherein the routing means routes the electronic mail to the sending means which can send mail in the recipient's format by routing the electronic mail to the sending gateway means associated with the sending means which can send electronic mail in the recipient's format.

17. A method for communicating electronic mail between a sender organization and a recipient organization which can receive mail in a recipient's format comprising the steps of:

(a) receiving electronic mail in a sender's format from a sender organization, said electronic mail identifying a recipient organization for which the electronic mail is destined;

(b) determining the recipient's format from the identity of the recipient organization; and (c) routing the electronic mail to an exchange means which can send the electronic mail to the recipient organization in the recipient's format.

18. The method as defined in claim 17 wherein step (b) of determining the recipient's format further comprises the steps of:

searching for the recipient organization in a memory means containing information regarding which electronic mail format is used by each organization of a plurality of organizations, and if information regarding the recipient organization is located in the memory means, transferring the information regarding the electronic mail format used by the recipient organization, which electronic mail format corresponds to the recipient's format, from the memory means to the routing means; and if the recipient organization is not located in the memory means, searching for information regarding the recipient organization in a remotely located database, and if information regarding the recipient organization is located in the remotely located database, transferring the information regarding the electronic mail format used by the recipient organization, which electronic mail format corresponds to the recipient's format, from the remotely located memory means to the routing means.

19. The method as defined in claim 18 further comprising the step of:

routing the electronic mail to an exchange means which can send the electronic mail to the recipient organization through an internet which uses a standard formatted address, if the recipient organization cannot be located in the memory means or the remotely located memory means; and wherein the electronic mail identifies the recipient organization by the standard formatted address.

20. The method as defined in claim 19 further comprising the steps of:

converting the electronic mail from the sender's format to a standard format upon receipt of the electronic mail from the sender organization; and converting the electronic mail from the standard format to the recipient's format when the electronic mail is routed to the exchange means which can send the electronic mail to the recipient organization in the recipient's format.

* * * * *